72-188
SP
FIP8009 OR RE 4,686
BEST AVAILABLE COPY (163.)

JAMES H. BURTON.

Improvement in the Manufacture of Gun Barrels.

No. 4,686. Reissued Dec. 26, 1871.

Witnesses.
Chas. A. Pettit
John A. Ramon

Inventor.
James Henry Burton
by Munn & Co
Attys

AM PHOTO-LITHOGRAPHIC CO. N.Y. (SEABORNE'S PROCESS)

UNITED STATES PATENT OFFICE.

JAMES HENRY BURTON, OF LEEDS, ENGLAND, ASSIGNOR TO JAMES T. AMES.

IMPROVEMENT IN THE MANUFACTURE OF GUN-BARRELS.

Specification forming part of Letters Patent No. 27,539, dated March 20, 1860; antedated September 29, 1859; reissue No. 4,686, dated December 26, 1871.

SPECIFICATION.

I, JAMES HENRY BURTON, of the county of Loudoun, State of Virginia, now sojourning at Leeds, England, have invented certain new and useful Improvements in the Manufacture of Gun-Barrels; and I do hereby declare that the following is a full, clear, and exact description thereof, and of the construction and operation of the same.

My invention relates to the manufacture of gun-barrels, and will be first fully described and then clearly pointed out in the claims.

I take a short, solid, cylindrical bar of hammered or rolled steel or iron, of the proper dimensions and weight; I slightly anneal it, then through the center of its entire length a hole is drilled of sufficient size to allow for the proper contraction when the cylinder is elongated. The cylinder is then heated to the degree required in rolling steel or iron, as the necessity for a welding heat is by my mode obviated and the temper and strength of the material used thereby more perfectly preserved. In this state the heated cylinder is subjected to the action of corresponding taper grooves on the peripheries of a pair of rollers, and containing a graduated series of them, to be used, if required, in succession. The cylinder is presented to these rolls upon fixed mandrels, (so called,) the series of which is likewise graduated, whereby the size of the hole reduced in the elongation is determined. By these operations the desired length of barrel is obtained, the proper taper form is imparted to its exterior, and the interior or bore is given a proper and reduced uniform diameter. The barrel is then bored, turned, and finished in the usual way.

To enable others skilled in the art to make and use my invention, I will proceed to describe the same in connection with the accompanying drawing, wherein—

Figure 1:
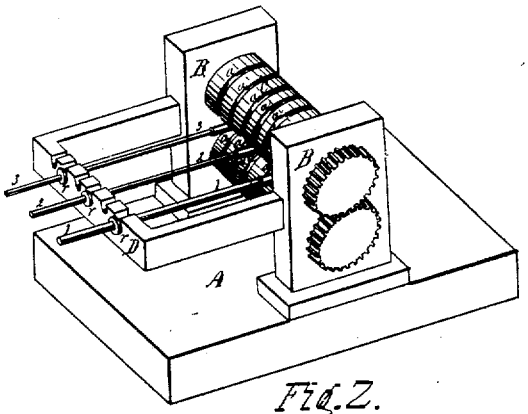
Figure 2:
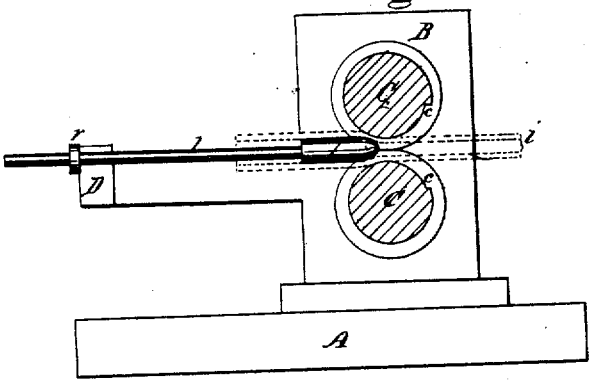
Figure 3:
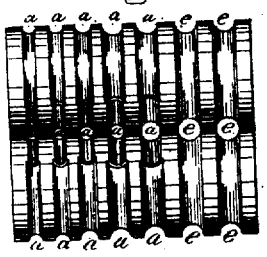
Figure 4:
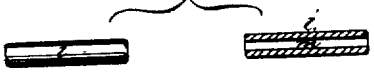
Figure 5:
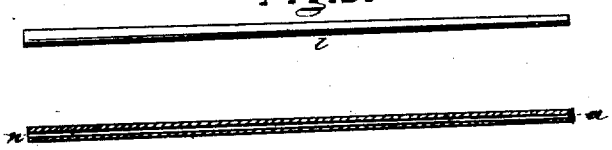

Figure 1 represents in perspective a set of grooved rolls and the mandrels connected therewith. Fig. 2 represents a vertical longitudinal section through the frame, rolls, &c. Fig. 3 represents a front view of the rolls, showing their tapering grooves; and Figs. 4 and 5 represent, respectively, a side view and section of the cylinder or block and of the rolled-out barrel, showing their comparative diameter, bore, and length in the cylinder and in the rolled-out state.

Similar letters of reference, where they occur in separate figures, denote like parts of the mechanism in all of them.

A is a bed, upon which is mounted pillar-blocks B B for sustaining two grooved rollers C C, that are geared together so as to be revolved together by any first-moving power. These rolls are furnished with a series of grooves, *a a*, of variable sizes, but all tapering in the line of their windings around the rolls, as shown at the points *c c* of Fig. 3. The grooves *e e* are simply preparatory or reducing grooves, and need not be made tapering. 1 2 3 represent a series of mandrels of graduated sizes, each one of the size suitable for the special pass or groove of the rolls that it is to work with, the series of grooves and mandrels gradually diminishing in diameter, so that each pass through between the rolls shall not only diminish the diameter of the cylinder but diminish its bore also; and in drawing out the cylinder it is tapered also by the tapering form of the grooves *a a*.

The process and operation is as follows: A cylinder, *i*, of iron or steel of suitable dimensions, is first prepared, drilled, as hereinbefore set forth, the end of the cylinder being rounded somewhat to facilitate its entrance between the rolls. When so prepared and properly heated or annealed it is first drawn out or rolled from the mandrel 1, which is somewhat smaller in diameter than the bore of the cylinder, which reduces and at the same time elongates the cylinder in a tapered form, the bore of the cylinder being also reduced in size. It is next subjected to a similar operation over mandrel 2, smaller than the first, which still further elongates and reduces both the cylinder and its bore, and so again over mandrel 3, and succeeding similar operations, if necessary, until the barrel is drawn out as shown in Fig. 5, with a bore reduced as shown at *n* in the section Fig. 5. The gun-barrels thus rolled out and formed must, of course, have the bore trued up; but will be found to be well-shaped and true in a general line, and far superior to welded barrels, and by properly shaping the grooves around the rolls the exterior taper form desired is secured. The bar D is furnished with rests or supports, in which the mandrels are placed to keep them in line with their grooves, and a collar, *r*, on the mandrels, prevents them from being drawn into the rolls. The arrows in Fig. 2 show the direction in which the rolls move.

Having thus fully described my invention and the manner of producing the same, what I claim as new, and desire to secure by Letters Patent, is—

1. The process of manufacturing gun-barrels by first perforating a solid bar of wrought metal, and then tapering from breech to muzzle, and reducing the thickness of the shell at the same time that the bore of the barrel is uniformly decreased, as set forth.

2. A pair of rollers provided with the series of gradually decreasing and tapering grooves *a*, combined with a series of gradually diminishing and relatively smaller mandrels, but each one uniform in its own diameter, when constructed and arranged as and for the purpose set forth.

3. A gun-barrel made of wrought metal, tapering in external form, of cylindrical bore, and without weld or seam, as described.

JAMES HENRY BURTON.

Witnesses:
C. M. BURTON,
H. S. ELLIS.

(163)